US008092918B2

(12) United States Patent
Kurth et al.

(10) Patent No.: US 8,092,918 B2
(45) Date of Patent: Jan. 10, 2012

(54) POLYAMIDE MATRICES AND METHODS FOR THEIR PREPARATION AND USE

(75) Inventors: Christopher J. Kurth, Pacific Palisades, CA (US); Isaac K. Iverson, Columbia, SC (US); Philip M. Rolchigo, Eden Prairie, MN (US); Steven D. Kloos, Chanhassen, MN (US); Leonard T. Hodgins, Closter, NJ (US)

(73) Assignee: GE Osmonics, Inc., Minnetonka, MN (US)

( * ) Notice: Subject to any disclaimer, the term of this patent is extended or adjusted under 35 U.S.C. 154(b) by 482 days.

(21) Appl. No.: 12/032,388

(22) Filed: Feb. 15, 2008

(65) Prior Publication Data

US 2008/0277342 A1 Nov. 13, 2008

Related U.S. Application Data

(63) Continuation-in-part of application No. 11/204,425, filed on Aug. 16, 2005, now Pat. No. 7,909,179, application No. 11/495,810, filed on Jul. 28, 2006, now Pat. No. 7,575,687.

(51) Int. Cl.

| | |
|---|---|
| ***C08G 65/34*** | (2006.01) |
| ***B01D 39/00*** | (2006.01) |

(52) U.S. Cl. .................. 428/480; 210/500.38; 210/490; 264/48; 428/422

(58) Field of Classification Search .................. 210/490, 210/500.27, 500.38, 500.39, 652, 653; 526/262; 428/402, 35.8; 528/422, 480; 549/65; 564/86; 514/238.2; 264/41, 48; 427/244, 245

See application file for complete search history.

(56) References Cited

U.S. PATENT DOCUMENTS

| | | | | |
|---|---|---|---|---|
| 4,277,344 | A * | 7/1981 | Cadotte | 210/654 |
| 4,302,336 | A * | 11/1981 | Kawaguchi et al. | 210/654 |
| 4,761,234 | A * | 8/1988 | Uemura et al. | 210/500.38 |
| 4,948,506 | A * | 8/1990 | Lonsdale et al. | 210/490 |
| 4,960,517 | A * | 10/1990 | Cadotte | 210/639 |
| 5,389,449 | A * | 2/1995 | Afeyan et al. | 428/523 |
| 5,627,217 | A * | 5/1997 | Rilling et al. | 521/50 |
| 6,025,457 | A * | 2/2000 | Ohno et al. | 528/170 |
| 6,837,996 | B2 * | 1/2005 | Kurth et al. | 210/500.38 |
| 7,098,296 | B2 * | 8/2006 | Bowles et al. | 528/422 |
| 7,138,058 | B2 * | 11/2006 | Kurth et al. | 210/500.38 |

* cited by examiner

*Primary Examiner* — Ana Fortuna

(74) *Attorney, Agent, or Firm* — GE Global Patent Operation; Catherine J. Winter

(57) ABSTRACT

The invention provides novel polymer matrices and methods for preparing polymer matrices, as well as methods for purifying caustic feed streams using membranes that comprise polysulfonamide matrices.

23 Claims, 4 Drawing Sheets

Figure 1

Table 1

| | Example 1 (polyamide) | A value | % Pass | Example 2 (polysulfonamide) | A value | % Pass |
|---|---|---|---|---|---|---|
| $NO_2$ / $SO_2Cl$ | 294-76a | 6.3 | 0.16 | 294-69 | 3.0 | [illegible] |
| | control | 8.1 | 0.47 | control | 9.7 | 40.5 |
| | | | | 294-68a | 3.4 | 4.2 |
| | | | | control | 14.3 | 46.7 |
| $NO_2$ / $SO_2Cl$ | 294-76b | 6.4 | 0.19 | | | |
| | control | 8.1 | 0.47 | | | |
| $O_2N$ / $SO_2Cl$ | 294-87a | 8.9 | 0.55 | 294-84a | 6.9 | 8.9 |
| | control | 9.7 | 0.82 | control (84c) | 15 | 43.2 |
| $SO_2Cl$ | 294-65b | 6.1 | 0.78 | | | |
| | control | 8.5 | 0.68 | 294-66c | [illegible] | 6.8 |
| | | | | control | 14.8 | 53.7 |
| | | | | 294-66a | 3.2 | 1.7 |
| | | | | control (66a) | [illegible] | 54.6 |
| OMe / $SO_2Cl$ | 294-70c | 6.8 | 0.48 | 294-70a | 2.2 | 1.9 |
| | control | 8.0 | 0.71 | control | [illegible] | 54.6 |
| Br / $SO_2Cl$ | 294-72e | 6.5 | 0.41 | 294-72d | 4.2 | 2.6 |
| | control | 8.5 | 0.68 | control | 14.3 | 46.7 |
| Br / $SO_2Cl$ | 294-74a | 5.6 | 0.33 | 294-74g | 8.3 | 3.8 |
| | control | 8.2 | 0.72 | control | 14.3 | 46.7 |
| Br / $SO_2Cl$ | 294-74h (PVA coat[illegible] | 7.3 | 0.25 | 294-74r | [illegible] | 4.5 |
| | control | 8.2 | 0.72 | control | 14.3 | 46.7 |
| $NO_2$ / $O_2N$ / $SO_2Cl$ | 294-72b | 7.0 | 0.37 | 294-72a | 7.0 | 2.9 |
| | control | 8.5 | 0.68 | control | 14.3 | 46.7 |
| Cl / $SO_2Cl$ | 294-74c | 6.2 | 0.26 | | | |
| | control | 8.5 | 0.68 | | | |
| OMe / MeO / $SO_2Cl$ | 294-92c | 8.9 | 0.74 | 294-94b | 7.3 | 7.2 |
| | control | 9.9 | 1.2 | control | 17 | 40 |
| $OCF_3$ / $SO_2Cl$ | 294-93b | 8.6 | 0.52 | | | |
| | control | 9.8 | 1.08 | | | |
| $CF_3SO_2Cl$ | 294-70d | 7.8 | 0.66 | 294-70b | [illegible] | 41.4 |
| | control | 8.0 | 0.71 | control | [illegible] | 54.6 |
| COOH / $SO_2Cl$ | 294-87b | 8.8 | 0.37 | 294-84b | 9.4 | 7.4 |
| | control | 9.7 | 0.82 | control (84c) | 15 | 43.2 |
| O / NH / $SO_2Cl$ | 294-92b | 9.3 | 0.5 | | | |
| | control | 9.9 | 1.2 | | | |
| $CF_3$ / $SO_2Cl$ | 294-86c | 7.8 | 0.38 | 294-67a | 4.7 | 2.2 |
| | control | 8.4 | 0.69 | control | 14.8 | 53.7 |
| $F_3C$ / $SO_2Cl$ | 294-85d | 7.7 | 0.34 | | | |
| | control | 8.4 | 0.69 | | | |
| $CF_3$ / $SO_2Cl$ | 294-85e | 9.2 | 0.59 | | | |
| | control | 8.4 | 0.69 | | | |
| $SO_2Cl$ | 294-88a | 11.5 | 1.02 | | | |
| $SO_2Cl$ | 294-00b | 11.4 | 0.86 | | | |
| | control | 9.4 | 0.80 | | | |

POLYAMIDE MATRICES AND METHODS FOR THEIR PREPARATION AND USE

PRIORITY OF INVENTION

This application is a Continuation-in-Part of co-pending U.S. patent application Ser. No. 11/204,425, filed 16 Aug. 2005, now U.S. Pat. No. 7,909,179. This application is also a Continuation-in-Part of co-pending U.S. patent application Ser. No. 11/495,810 titled Membranes and Methods Useful for Caustic Applications, filed 28 Jul. 2006, now U.S. Pat. No. 7,575,687. The entire content of each of these United States patent applications is hereby incorporated herein by reference.

BACKGROUND OF THE INVENTION

Semipermeable membranes play an important part in industrial processing technology and other commercial and consumer applications. Examples of their applications include, among others, biosensors, transport membranes, drug delivery systems, water purification systems, optical absorbers, and selective separation systems for aqueous and organic liquids carrying dissolved or suspended components.

Generally, semipermeable membranes operate in separation devices by allowing only certain components of a solution or dispersion to preferentially pass through the membrane. The fluid that is passed through the membrane is termed the permeate and comprises a solvent alone or in combination with one or more of the other agents in solution. The components that do not pass through the membrane are usually termed the retentate. The permeate and/or retentate may provide desired product.

Reverse osmosis (RO), nanofiltration (NF), ultrafiltration (UF), and microfiltration (MF) are examples of membrane processes. Microfiltration is a separation process that utilizes membranes having pores of sizes from about 0.1 microns to about 10 microns. Ultrafiltration is a separation process that utilizes membranes having defined pores of sizes of about 1 nm to about 0.1 microns. Ultrafiltration membranes are often characterized by their "molecular weight cutoff", a technique that defines the ability of ultrafiltration membranes to separate polymers from a solvent. A molecular weight cut-off method is described in ASTM method E1343-90 (1997)e1: "Standard Test Method for Molecular Weight Cutoff Evaluation of Flat Sheet Ultrafiltration Membranes".

Nanofiltration is a process where a favorable portion of at least one small agent (typically less than 1000 MW or a salt) passes through the membrane with the solvent and a desirable amount of at least one other small agent (typically less than 1000 MW or a salt) is retained. An example of a nanofiltration process is the desalting of a sugar solution, where 80% of the salt passes the membrane with the water and 95% of the sugar is retained by the membrane. In this example, the sugar and salt can be fractionated. Because nanofiltration is a process, the definition of a nanofiltration membrane is a membrane commonly used in nanofiltration processes.

Reverse osmosis is a process where the large majority of each agent in solution is retained by the membrane while the solvent passes through the membrane, with the common provision that at least one of the agents being removed in solution is small (less than 1000 MW or a salt). Examples of reverse osmosis processes are the purification of seawater, where often less than 1% of the species in the seawater are found in the permeate. Because reverse osmosis is a process, the definition of a reverse osmosis membrane is a membrane commonly used in reverse osmosis processes.

It should be well understood that a membrane commonly termed a nanofiltration membrane can be capable of reverse osmosis and vice versa. For example, a common so-called nanofiltration membrane, Desal 5 DK, can retain greater than 99% of magnesium sulfate from water. In this case, because the large majority of the magnesium sulfate is retained and the permeate contains a low amount of this salt, the process is reverse osmosis. Therefore, this is an example of a reverse osmosis process using a "nanofiltration" membrane. Also, a common reverse osmosis membrane, Desal 3 SG, can pass hydrofluoric acid with water while retaining simple ions such as sodium, copper, and chloride. In this example, the membrane discriminates between the HF and the other small agents in solution, making it a nanofiltration process using a "reverse osmosis" membrane.

The performance of RO and NF membranes typically is characterized by two parameters: permeate flux and solute rejection. The flux parameter indicates the rate of permeate flow per unit area per unit pressure of membrane. The rejection indicates the ability of the membrane to retain certain components while passing others.

RO and NF membrane processes require a pressure or concentration gradient in order to perform the desired separation. When functioning to separate, the process using a reverse osmosis membrane overcomes the osmotic pressure resulting from the differential concentration of salts across the membrane. Pressure must be applied to the feed solution being separated in order to overcome this osmotic pressure and to cause a reasonable flux of permeate. RO and NF membranes typically exhibit high flow rates or fluxes at reasonable pressures. Currently, such membrane fluxes on the order of about $1*10^{-5}$ to $50*10^{-5}$ $cm^3/cm^2*sec*atm$.

The majority of RO and NF membranes are constructed as composite membranes having a thin barrier membrane formed as a coating or layer on top of a porous support material. Typically, this RO or NF membrane is formed by interfacial polymerization of a thin film on a porous support. For example, U.S. Pat. No. 3,744,642 to Scala discloses an interfacial membrane process for preparation of a reverse osmosis membrane. Additional U.S. patents disclosing polyamide and polysulfonamide membranes include U.S. Pat. Nos. 4,277,344; 4,761,234; 4,765,897; 4,950,404; 4,983,291; 5,658,460; 5,627,217; 5,693,227; 6,783,711; and 6,837996.

Current interfacially prepared membranes substantially reach the goals of extreme thinness and substantial freedom from flaws or imperfections. The closer an RO or NF membrane comes to these two goals, the better is its flux and rejection values. These two features of minimal thickness and freedom from flaws, however, are not altogether compatible objectives. As the thickness of the polymeric film or membrane decreases, the probability increases significantly that holes or void spaces in the film structure will be formed. Of course, these holes or void spaces result in significant loss of solute rejection.

When processing conditions to form such thin and defect free membranes are found, it is often the case that changes to those conditions are detrimental to performance. As a result, much work on improved interfacial membranes has focused on ways to alter the membrane without changing the process used to initially form the membrane. One common means of affecting the character of a membrane is through the use of post treatments. Post treatments leading to improved permeability, improved rejection, and improved resistance to fouling have been disclosed previously.

Post treatments meant to improve rejection have involved reactions with amine reactive molecules. U.S. Pat. No. 4,960, 517 teaches the use of amine reactive species which reduce the passage of sulfuric acid and U.S. Pat. No. 5,582,725 teaches the use of a post treatment with acyl halides after the membrane has been swollen and then redried.

There is currently a needed for new post treatment methods that can be chosen independent of the film forming reactants and can be used to selectively alter the thin film. This would enable freedom to tailor the post treatment chemistry to improve rejection or fouling characteristics of the membrane while retaining the same reactants and process conditions used to initially form the membrane. These post treatment methods should utilize reagents that are quite reactive with residual amine groups to allow rapid modification, but not highly reactive with the solvent used in the modification, for example alcohols. Such post treatments would allow a single manufacturing process to produce multiple products by alteration of the functionality present on the post treatment molecule.

The Bayer process is used industrially to recover aluminum hydroxide from bauxite. U.S. Pat. No. 4,786,482 reports the use of porous polysulfone hollow fibers coated with a semipermeable sulfonated polysulfone membrane to reduce the levels of organic and inorganic impurities in caustic liquors. Although this patent issued more than 15 years ago, membranes are not routinely used in industry for purifying highly caustic streams, because membranes having a commercially viable combination of flow, rejection, and caustic stability have not been identified. Accordingly, there is also currently a need for materials and methods that can be used to remove impurities from caustic streams, such as the caustic streams generated by a Bayer alumina recovery process.

SUMMARY OF THE INVENTION

Applicant has discovered a post treatment method that is independent of the film forming reactants and that can be can be used to selectively alter the properties of a thin film. This method allows a single manufacturing process to produce multiple products by alteration of the amine functionality present on an insoluble branched condensation polymer matrix.

In one embodiment the invention provides a modified insoluble branched condensation polymer matrix comprising, 1) an insoluble branched condensation polymer matrix comprising reactant residues, and 2) a plurality of aryl residues that differ from said reactant residues and that are terminally-linked to the insoluble branched condensation polymer matrix through sulfonamide bonds.

In another embodiment the invention provides a modified insoluble branched condensation polymer matrix comprising 1) an insoluble branched polyamide matrix, and 2) a plurality of aryl residues that are terminally-linked to the insoluble branched polyamide matrix through sulfonamide bonds.

In another embodiment the invention provides a modified insoluble branched condensation polymer matrix that comprises, 1) an insoluble branched condensation polymer matrix, and 2) a plurality of aryl residues of the formula Ar—$SO_2$—, wherein each Ar is, 1) a 6-20 carbon monocyclic, bicyclic, or polycyclic ring system in which at least one ring is aromatic, which ring system is optionally be substituted with one or more substituents independently selected from cyano, halo, hydroxy, mercapto, nitro, carboxy, ($C_1$-$C_{20}$)alkyl, ($C_1$-$C_{20}$)alkoxy, ($C_1$-$C_{20}$)alkoxycarbonyl, ($C_1$-$C_{20}$)alkanoyloxy, phenyl, or —$NR_aR_b$, wherein $R_a$ and $R_b$ may be the same or different and are chosen from hydrogen ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy, or wherein $R_a$ and $R_b$ together with the nitrogen to which they are attached form a pyrrolidino, piperidino, morpholino, or thiomorpholino ring; wherein each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy is optionally substituted with one or more cyano, halo, hydroxy, mercapto, nitro, carboxy, sulfo, oxo (=O), thioxo (=S) or —$NR_aR_b$ and wherein one or more carbons of each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy can optionally be replaced with —O—, —S—, or —$NR_c$—, wherein each $R_c$ is independently hydrogen, ($C_1$-$C_6$)alkyl, ($C_1$-$C_6$)alkoxy, ($C_1$-$C_6$)alkoxycarbonyl, and ($C_1$-$C_6$)alkanoyloxy; or 2) a 1-20 carbon monocyclic, bicyclic, or polycyclic ring system in which at least one heteroatom (i.e. non-carbon atom) containing ring is aromatic, which ring system can optionally be substituted with one or more substituents independently selected from cyano, halo, hydroxy, mercapto, nitro, carboxy, ($C_1$-$C_{20}$)alkyl, ($C_1$-$C_{20}$)alkoxy, ($C_1$-$C_{20}$)alkoxycarbonyl, ($C_1$-$C_{20}$)alkanoyloxy, or —$NR_aR_b$, wherein $R_a$ and $R_b$ may be the same or different and are chosen from hydrogen ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy, or wherein $R_a$ and $R_b$ together with the nitrogen to which they are attached form a pyrrolidino, piperidino, morpholino, or thiomorpholino ring; wherein each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy is optionally substituted with one or more cyano, halo, hydroxy, mercapto, nitro, carboxy, sulfo, oxo (=O), thioxo (=S) or —$NR_aR_b$ and wherein one or more carbons of each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy can optionally be replaced with —O—, —S—, or —$NR_c$—, wherein each $R_c$ is independently hydrogen, ($C_1$-$C_6$)alkyl, ($C_1$-$C_6$)alkoxy, ($C_1$-$C_6$)alkoxycarbonyl, and ($C_1$-$C_6$)alkanoyloxy;

In another embodiment the invention provides a method for preparing a modified insoluble branched condensation polymer matrix comprising, treating an insoluble branched condensation polymer matrix comprising reactant residues and having a plurality of primary or secondary amine groups, with a compound of the formula Ar—$SO_2$_X, wherein each X is a leaving group, each Ar is an aryl group or a heteroaryl group, and the reactant residues are not Ar—$SO_2$—, to provide the modified insoluble branched condensation polymer matrix.

In another embodiment the invention provides a method for preparing a modified insoluble branched condensation polymer matrix comprising treating an insoluble branched polyamide matrix having a plurality of primary or secondary amine groups with a compound of the formula Ar—$SO_2$—X, wherein each X is a leaving group, and each Ar is an aryl group or a heteroaryl group, to provide the modified insoluble branched condensation polymer matrix.

In another embodiment the invention provides a method for preparing a modified insoluble branched condensation polymer matrix comprising treating an insoluble branched condensation polymer matrix having a plurality of primary or secondary amine groups, with a compound of the formula Ar—$SO_2$—X, wherein each X is a leaving group, and each Ar is 1) a 6-20 carbon monocyclic, bicyclic, or polycyclic ring system in which at least one ring is aromatic, which ring system is optionally be substituted with one or more substituents independently selected from cyano, halo, hydroxy, mercapto, nitro, carboxy, ($C_1$-$C_{20}$)alkyl, ($C_1$-$C_{20}$)alkoxy, ($C_1$-$C_{20}$)alkoxycarbonyl, ($C_1$-$C_{20}$)alkanoyloxy, phenyl, or —$NR_aR_b$, wherein $R_a$ and $R_b$ may be the same or different and are chosen from hydrogen ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy, or wherein $R_a$ and $R_b$ together with the nitrogen to which they are attached form a pyrrolidino, piperidino, morpholino, or thiomorpholino ring; wherein each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy is optionally substituted with one or more cyano, halo, hydroxy, mercapto, nitro, carboxy, sulfo, oxo (═O), thioxo (═S) or —$NR_aR_b$ and wherein one or more carbons of each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy can optionally be replaced with —O—, —S—, or —$NR_c$—, wherein each $R_c$ is independently hydrogen, ($C_1$-$C_6$)alkyl, ($C_1$-$C_6$)alkoxy, ($C_1$-$C_6$)alkoxycarbonyl, and ($C_1$-$C_6$)alkanoyloxy; or 2) a 1-20 carbon monocyclic, bicyclic, or polycyclic ring system in which at least one heteroatom (i.e. non-carbon atom) containing ring is aromatic, which ring system can optionally be substituted with one or more substituents independently selected from cyano, halo, hydroxy, mercapto, nitro, carboxy, ($C_1$-$C_{20}$)alkyl, ($C_1$-$C_{20}$)alkoxy, ($C_1$-$C_{20}$)alkoxycarbonyl, ($C_1$-$C_{20}$)alkanoyloxy, or —$NR_aR_b$, wherein $R_a$ and $R_b$ may be the same or different and are chosen from hydrogen ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy, or wherein $R_a$ and $R_b$ together with the nitrogen to which they are attached form a pyrrolidino, piperidino, morpholino, or thiomorpholino ring; wherein each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy is optionally substituted with one or more cyano, halo, hydroxy, mercapto, nitro, carboxy, sulfo, oxo (═O), thioxo (═S) or —$NR_aR_b$ and wherein one or more carbons of each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy can optionally be replaced with —O—, —S—, or —$NR_c$—, wherein each $R_c$ is independently hydrogen, ($C_1$-$C_6$)alkyl, ($C_1$-$C_6$)alkoxy, ($C_1$-$C_6$)alkoxycarbonyl, and ($C_1$-$C_6$)alkanoyloxy; to provide the modified insoluble branched condensation polymer matrix.

In another embodiment the invention provides a matrix prepared according to a method of the invention.

Applicant has also unexpectedly found that polysulfonamide membranes (including primary sulfonamide membranes) are particularly useful for fractionating the components of caustic feed streams. Polysulfonamide membranes have been found to possess a combination of flow, rejection, and caustic stability that make them a viable commercial option for fractionating caustic streams such as those generated by a Bayer alumina recovery process. For example, sulfonamide membranes can be used to concentrate organic impurities in the feed liquor prior to an incinerator in order to lower the volume of material incinerated and/or to increase the amount of organics incinerated. These findings are particularly surprising for primary sulfonamide containing membranes, because it was previously assumed that primary sulfonamide protons would be labile in a caustic environment, and that their removal would lead to membrane swelling and decreased performance.

Accordingly, the invention provides a method comprising contacting a membrane comprising a polysulfonamide matrix with a feed solution having a pH of at least about 11, so that the feed solution is fractionated into a permeate and into a retentate.

BRIEF DESCRIPTION OF THE FIGURES

FIG. 1 shows salt water testing values for membranes prepared according to Examples 1 and 2 vs. untreated control membrane for various aryl sulfonyl chlorides dissolved in MeOH.

DETAILED DESCRIPTION OF THE INVENTION

Definitions

Figure 2:
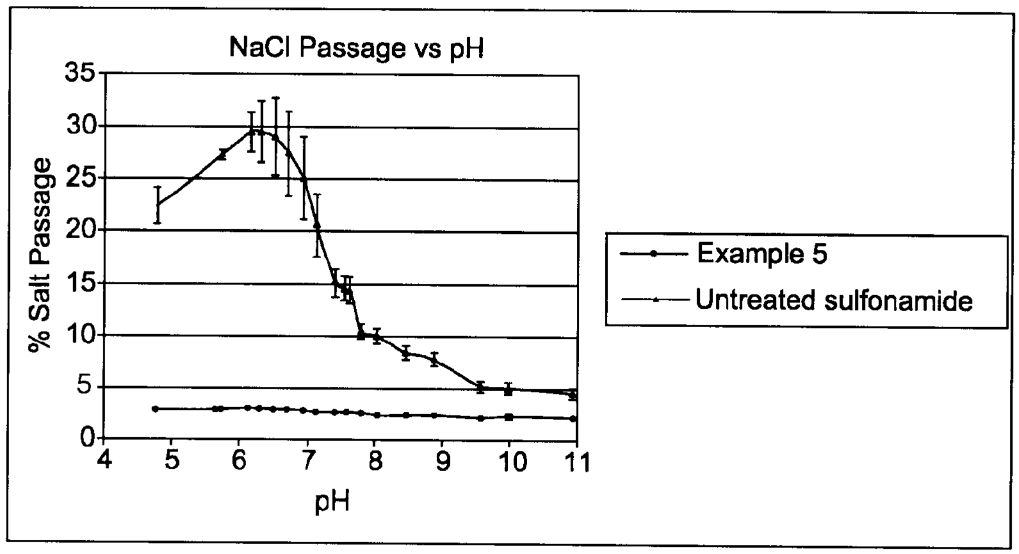
FIG. 2 is a graph showing % NaCl passage vs. pH for a membrane prepared according to Example 5 vs. an untreated control membrane.

As used herein, a “residue” is the portion of a reactant that remains as part of a matrix after it has reacted and consists of atoms present in the reactant prior to reaction. Additional atoms may have left during reaction, and other transformations such as a ring opening may have occurred, which lead to differences in structure between residues and reactants. For example, an aryl sulfonyl chloride reacted with an amine group of a matrix would form a sulfonamide linked aryl residue; the “residue” consists of the aryl ring, any groups substituted on the aryl ring, and the sulfur dioxide moiety; the nitrogen would not be part of the residue, as it was part of the precursor matrix, not of the reactant. If in this example the aryl sulfonyl chloride reactant was p-toluenesulfonyl chloride, the residue would be p-$CH_3$—$C_6H_4$—$SO_2$—.

As used herein, an “insoluble branched condensation polymer matrix” is a polymer that posses at least some residues that have greater than two sites where monomers have added, leading to a branch point in the polymer chain. The residues bound to the branch points may be short and consist of only 1 additional residue, or may be of large molecular weight and contain hundreds or even thousands of additional residues. The residues may also connect with another branch point and form a crosslink. The branch points may fall primarily along a main polymer giving a comb-like structure, or there may be a series of branches on other branches giving a dendritic structure.

As used herein, an “insoluble” matrix is a matrix that is incapable of forming a one phase liquid solution with a suitable solvent, without first breaking chemical bonds within the matrix itself. Insoluble matrices typically result from crosslinking, crystallinity, or other phenomena.

Condensation polymers typically comprise repeating functional groups, such as esters, amides, sulfonamides, urethanes, sulfides, sulfones, ethers, or other olefinic groups, within their polymeric backbone. They are often prepared from reactants that lose atoms during the formation of the polymer, resulting in a polymer that comprises residues of the reactants. For example, a condensation polymer can be formed by reacting a polysulfonyl halide reactant with a polyamine reactant to provide a polysulfonamide condensation polymer; during the polymer forming condensation reaction, HCl is lost from the reactants.

As used herein, the term “matrix” means a regular, irregular and/or random arrangement of polymer molecules such that on a macromolecular scale the arrangements of molecules may show repeating patterns, or may show series of patterns that sometimes repeat and sometimes display irregularities, or may show no pattern. The molecules may or may not be cross-linked. On a scale such as would be obtained from SEM, X-Ray or FTNMR, the molecular arrangement may show a physical configuration in three dimensions like those of networks, meshes, arrays, frameworks, scaffoldings, three dimensional nets or three dimensional entanglements of molecules. The matrix may be non-self supporting. Preferably, the matrix is in the form of a thin film with an average thickness from about 5 nm to about 10000 nm, and more preferably about 5 to about 400 nm. In usual practice, the matrix is grossly configured as an ultrathin film or sheet.

As used herein, the term "membrane" means a semipermeable material which can be used to separate components of a feed fluid into a permeate that passes through the membrane and a retentate that is rejected or retained by the membrane.

As used herein, the term "composite membrane" means a matrix layered or coated on at least one side of a support material.

As used herein, the term "support material" means any substrate upon which the matrix can be formed or applied. Included are semipermeable membranes especially of the micro- and ultrafiltration kind, fabric, filtration materials as well as others. The substrate may be porous, microporous or non-porous.

As used herein, the term "terminally linked" means that the group is covalently bonded to the polymer matrix at only one point, and the linkage is through a sulfonamide group.

As used herein, the term "aryl residue" is a residue as defined herein, that includes an aryl group or a heteroaryl group.

As used herein, the term "aryl group" includes a 6-20 carbon monocyclic, bicyclic, or polycyclic ring system in which at least one ring is aromatic. An aryl group can optionally be substituted with one or more substituents independently selected from cyano, halo, hydroxy, mercapto, nitro, carboxy, sulfo, $(C_1\text{-}C_{20})$alkyl, $(C_1\text{-}C_{20})$alkoxy, $(C_1\text{-}C_{20})$alkoxycarbonyl, $(C_1\text{-}C_{20})$alkanoyloxy, phenyl, or —$NR_aR_b$, wherein $R_a$ and $R_b$ may be the same or different and are chosen from hydrogen $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy, or wherein $R_a$ and $R_b$ together with the nitrogen to which they are attached form a pyrrolidino, piperidino, morpholino, or thiomorpholino ring; wherein each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy is optionally substituted with one or more cyano, halo, hydroxy, mercapto, nitro, carboxy, sulfo, oxo (=O), thioxo (=S) or —$NR_aR_b$ and wherein one or more carbons of each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy can optionally be replaced with —O—, —S—, or —$NR_c$—, wherein each $R_c$ is independently hydrogen, $(C_1\text{-}C_6)$alkyl, $(C_1\text{-}C_6)$alkoxy, $(C_1\text{-}C_6)$alkoxycarbonyl, and $(C_1\text{-}C_6)$alkanoyloxy. Examples of 6-20 carbon monocyclic, bicyclic, or polycyclic ring systems in which at least one ring is aromatic include phenyl, naphthyl, indol, anthrocenyl, phenanthryl, perylene, pyrenyl, tetrahydronaphthyl benzopyrene, and azulene.

As used herein, the term "heteroaryl group" is a 1-20 carbon monocyclic, bicyclic, or polycyclic ring system in which at least one heteroatom (i.e. non-carbon atom) containing ring is aromatic. A heteroaryl group can optionally be substituted with one or more substituents independently selected from cyano, halo, hydroxy, mercapto, nitro, carboxy, sulfo, $(C_1\text{-}C_{20})$alkyl, $(C_1\text{-}C_{20})$alkoxy, $(C_1\text{-}C_{20})$alkoxycarbonyl, $(C_1\text{-}C_{20})$alkanoyloxy, or —$NR_aR_b$, wherein $R_a$ and $R_b$ may be the same or different and are chosen from hydrogen $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy, or wherein $R_a$ and $R_b$ together with the nitrogen to which they are attached form a pyrrolidino, piperidino, morpholino, or thiomorpholino ring; wherein each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy is optionally substituted with one or more cyano, halo, hydroxy, mercapto, nitro, carboxy, sulfo, oxo (=O), thioxo (=S) or —$NR_aR_b$ and wherein one or more carbons of each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy can optionally be replaced with —O—, —S—, or —$NR_c$—, wherein each $R_c$ is independently hydrogen, $(C_1\text{-}C_6)$alkyl, $(C_1\text{-}C_6)$alkoxy, $(C_1\text{-}C_6)$alkoxycarbonyl, and $(C_1\text{-}C_6)$alkanoyloxy. Examples of 1-20 carbon monocyclic, bicyclic, or polycyclic ring system in which at least one heteroatom (i.e. non-carbon atom) containing ring is aromatic include pyridyl, thienyl, furyl, pyrrole, thiophene, pyrimidine, imidazole, indole, isoindole, purine, quinoline, isoquinoline, acridine, benzothiophene, benzofuran, benzimidazole, oxazole, and thiazole.

A "primary sulfonamide polymer" means a solid phase polymer comprising one or more sulfonamide groups (—$SO_2NH$—) in the polymer backbone. Typically, such polymers are made at least in part by allowing one or more primary amines to react with one or more sulfonyl halides.

The "moles of titratable alkali" in a given amount of solution can be determined by measuring the moles of a monoprotonic acid (for example hydrochloric acid) that must be added to provide a neutral (pH 7) solution.

The "leaving group" X can be any group which is suitable to allow the reagent Ar—$SO_2$—X to react with a primary or secondary amine to provide a sulfonamide bond. Suitable leaving groups are known, for example, see U.S. Pat. No. 4,778,596. Examples of suitable leaving groups include halogens (e.g. fluoro, chloro or bromo), sulfonates, pyridine salts, and dimethylamino pyridine complexes.

Post-Treatment Materials

As discussed above, there is a need for post treatment methods that can be chosen independent of the film forming reactants and that can be used to selectively alter a thin film. Such post treatments methods would allow a single manufacturing process to produce multiple products by alteration of the amine functionality present on an insoluble branched condensation polymer matrix.

The post-treatment methods of the invention allow for the preparation of a modified insoluble branched condensation polymer matrix comprising, 1) an insoluble branched condensation polymer matrix comprising reactant residues, and 2) a plurality of aryl residues that differ from said reactant residues and that are terminally-linked to the insoluble branched condensation polymer matrix through sulfonamide bonds. It is to be understood that according to the invention, post treatment with a multi-functional aryl sulfonyl reagent may result in some cross-linking, so that some of the aryl sulfonyl residues from the post-treatment may not be terminally-linked as defined hereinabove. Accordingly, in one specific embodiment of the invention, less than 10 weight percent of the modified insoluble branched condensation polymer matrix is post-treatment residues that are not terminally-linked. In another specific embodiment of the invention, less than 5 weight percent of the modified insoluble branched condensation polymer matrix is post-treatment residues that are not terminally-linked. In another specific embodiment of the invention, less than 1 weight percent of the modified insoluble branched condensation polymer matrix is post-treatment residues that are not terminally-linked.

In one specific embodiment of the invention, the modified matrix materials of the invention can be incorporated into beads, sheets, or films.

Post-Treatment Methods

The invention provides a method for preparing a modified insoluble branched condensation polymer matrix comprising, treating an insoluble branched condensation polymer matrix comprising reactant residues and having a plurality of primary or secondary amine groups, with a compound of the formula Ar—$SO_2$—X, wherein each X is a leaving group and each Ar is an aryl group or a heteroaryl group. According to the methods of the invention, the reactant residues in the starting matrix differ from Ar—$SO_2$—. Thus, following post-treatment using a method of the invention, the resulting modified matrix is capped with aryl sulfonyl groups that differ from the residues within the starting matrix. Accordingly, the methods of the invention allow for the preparation of novel matrix materials having unique caps that impart specific properties to the matrix. By modifying the composition of the capping groups, the properties of the matrix can be tuned for a specific application.

In one specific embodiment, the starting matrix can be treated with base to facilitate the sulfonamide forming reaction.

In another specific embodiment, the sulfonamide forming reaction can be carried out in a lower alcohol (e.g. methanol).

Caustic Applications

It has surprisingly been found that polysulfonamide membranes have the ability to conduct separations in extreme high pH applications, even at high temperatures. Additionally, sulfonamide membranes unexpectedly yield stable performance under such conditions over significant periods of time. Accordingly, sulfonamide membranes can be used to conduct separations on caustic feed streams on a commercial scale.

Membranes for Caustic Applications

In one embodiment of the invention the polysulfonamide membrane is a membrane of the invention as described herein. In addition to the polysulfonamide membranes described herein, suitable polysulfonamide membranes for use in the caustic separation methods of the invention are also described in United States Patent Application Number US 2003/121857A1 and U.S. patent application Ser. No. 11/204,425. One particular polysulfonamide membrane that can be used for fractionating materials in a caustic environment is a Desal KH membrane, which is marketed by GE Osmonics. The KH membrane functions as a nanofilter in high pH applications by permeating water and hydroxide salts while retaining dissolved impurities. This is useful for recovering valuable materials from a caustic stream, by purifying the caustic for reuse or resale, or both.

In one embodiment, the membrane is a semipermeable membrane in flatsheet form (e.g. where the membrane is rolled up into a spiral wound module).

In one embodiment, the membrane is present on the surface of porous hollow fibers (for example, see U.S. Pat. No. 4,786,482).

Caustic Applications

In one embodiment, the methods and membranes of the invention can be used in nanofiltration applications to process high pH solutions (e.g., to pass alkali).

In another embodiment the methods and membranes of the invention can be used in reverse-osmosis applications to process high pH solutions (e.g., to concentrate alkali).

In one embodiment, the methods and membranes of the invention can be used to process mine mineral ore extracts. For example, in the Bayer process for Alumina manufacture, the membranes and methods of the invention can be used to concentrate liquor burner feed, to remove humate from incoming liquor feed, to remove impurities (e.g. organics) from lime treated seed wash feed, to remove impurities (e.g. organics) from washer overflow, or to remove impurities (e.g. organics) from spent liquor feed. In one embodiment, the methods and membranes of the invention can be used with caustic etching baths where removal of impurities can speed etch rates and minimize waste generation.

In one embodiment, the methods and membranes of the invention can be used with CIP (clean in place) solutions widely used in the food industry where purification could reduce caustic requirements and decrease the amount of waste generated.

In one embodiment, the methods and membranes of the invention can be used in the pulp and paper industry for purification of alkaline bleach solutions, amongst other streams.

Backings for Caustic Applications

Any suitable backing can be used for the membranes of the invention. Typically, the backing will comprise a non-woven fabric that has a thickness of about 4 to about 6, mils and will have similar air permeability and strength characteristics to conventional composite membrane non-woven backings. The non-woven fabric is typically composed of thermoplastic fibers that are inherently stable to the strong caustic conditions of the invention. In one embodiment, the backing material for the polysulfonamide composite membrane is a polyphenylene sulfide (PPS) material.

Caustic Separations

The methods and membranes of the invention can be used to fractionate a variety of solution components (e.g. impurities) into retentate or permeate fractions. For example, the impurity can be an inorganic material (e.g. a metal ion, a metal salt, etc.) or an organic material (e.g. a small organic molecule, a humate, an amino acid, a peptide, a protein, a lipid (e.g., a fatty acid) or an oil (e.g., a petroleum substance)). In one embodiment the impurity has a molecular weight of at least about 200 amu. In another embodiment the impurity has a molecular weight of at least about 500 amu. In another embodiment the impurity has a molecular weight of at least about 1000 amu. In another embodiment the impurity has a molecular weight of at least about 2000 amu.

Specific Embodiments for Caustic Applications

In one embodiment the feed solution has a pH of at least about 12.

In one embodiment the feed solution has a pH of at least about 14.

In one embodiment the feed solution comprises at least about 15% sodium hydroxide by weight.

In one embodiment the feed solution comprises at least about 20% sodium hydroxide by weight.

In one embodiment the feed solution comprises at least about 25% sodium hydroxide by weight.

In one embodiment the feed solution comprises at least 2.5 moles of titratable alkali per liter.

In one embodiment the feed solution comprises at least 5.0 moles of titratable alkali per liter.

In one embodiment the feed solution comprises at least 6.25 moles of titratable alkali per liter.

In one embodiment the feed solution is at a temperature of at least about 50° C.

In one embodiment the feed solution is at a temperature of at least about 75° C.

In one embodiment the feed solution is at a temperature of at least about 100° C.

In one embodiment the feed solution comprises at least one impurity that is concentrated in the permeate or in the retentate.

In one embodiment the feed solution comprises at least one impurity that is concentrated in the retentate.

In one embodiment the rejection of the impurity is at least about 35%.

In one embodiment the rejection of the impurity is at least about 50%.

In one embodiment the rejection of the impurity is at least about 75%.

In one embodiment the rejection of the impurity is at least about 90%.

In one embodiment the rejection of the impurity is at least about 98%.

In one embodiment the membrane rejects at least 35% of the impurity following at least 48 hours of contact with the feed solution.

In one embodiment the membrane rejects at least 50% of the impurity following at least 48 hours of contact with the feed solution.

In one embodiment the membrane rejects at least 75% of the impurity following at least 48 hours of contact with the feed solution.

In one embodiment the membrane rejects at least 90% of the impurity following at least 48 hours of contact with the feed solution.

In one embodiment the membrane rejects at least 98% of the impurity following at least 48 hours of contact with the feed solution.

In one embodiment the membrane rejects at least 35% of the impurity following at least 5 days of contact with the feed solution.

In one embodiment the membrane rejects at least 50% of the impurity following at least 5 days of contact with the feed solution.

In one embodiment the membrane rejects at least 75% of the impurity following at least 5 days of contact with the feed solution.

In one embodiment the membrane rejects at least 90% of the impurity following at least 5 days of contact with the feed solution.

In one embodiment the membrane rejects at least 98% of the impurity following at least 5 days of contact with the feed solution.

The invention will now be illustrated by the following non-limiting Examples.

EXAMPLES

Example 1

Representative Post-Treatment Procedure for Polyamide Membrane

Dry flat-sheet composite polyamide reverse osmosis membrane (FT30 from FilmTec) was clipped between two 8"×11" plastic frames. Deionized DI water was poured onto the face at a depth of a ¼" and allowed to soak for 20 minutes. A 1% (w/w) solution of the aryl sulfonyl chloride (see FIG. 1) was freshly made in MeOH with 0.2% (w/w) triethyl amine. The water was removed from the face of the membrane by simply draining for a few seconds. The MeOH solution containing the aryl sulfonyl chloride was poured on the face of the membrane to a depth of ⅛" and allowed to be in contact with the membrane for 2 minutes. The methanol solution was poured off and then the membrane face and back side were rinsed with excess water. The membrane was kept wet until testing.

Example 2

Representative Post-Treatment Procedure for Polysulfonamide Membrane

A hand frame of the base polysulfonamide membrane was made as follows. A commercially available PES diary UF membrane was clipped between two 8"×1" plastic frames and the membrane face with rinsed with excess water to remove residual chemicals. The water was drained off. A 2% (w/w) piperazine aqueous solution also containing 2% TEA and 4% camphor sulfonic acid and 0.1% (w/w) 4-(N,N-dimethylamino)-pyridine was added to the face side of the frame so that the depth of solution was ⅛". It was allowed to stay in contact for 1 minute. The aqueous amine solution was poured off and allowed to drain for a few seconds. Excess droplets of the amine solution were metered off the surface of the membrane by running the membrane face under an air knife. The amine laden membrane was immediately laid flat and 200 mL of 0.16% (w/w) 1,3,6-naphthalene trisulfonyl chloride in 20:80 mesitylene:Isopar G solution which had been pre-heated to 90° C. was carefully poured onto the corner of the frame surface. The solution was allowed to stay in contact with the frame for 2 minutes and then drained off with the temperature of the drained liquid about 45° C. After draining the organic phase, the frame was placed in a convection oven at a 45° angle face up for 8 minutes at 100° C. After removing the membrane from the oven and allowing to cool to RT, the membrane was wet out with DI water for 20 minutes as Example 1. After removing the water, a 1% (w/w) NaOH aqueous solution was poured on the face of the membrane for 1 minute and drained. A brief rinse of the membrane surface with about 10 mL of water was performed. The wet membrane was laid face up and immediately the MeOH solution constituted as Example 1 was poured on. The dwell time and rinsing were identical to those in Example 1. The membrane was kept wet until testing.

Table 1, in FIG. 1 shows salt water testing values for membranes prepared according to Examples 1 and 2 vs. the untreated control membrane for various aryl sulfonyl chlorides dissolved in MeOH. All data collected at 225 psig, pH 7 to 7.5, 2000 ppm NaCl in DI water, 75° F., 1 gpm cross-flow in cross-flow cells with 35 $cm^2$ membrane area. Permeability data in units of A value ($10^{-5}$ cm/atm*s). Salt transmission data (% Passage) measured as conductivity of permeate over feed.

Example 3

A commercial flat-sheet composite polyamide reverse osmosis membrane (FT30 from FilmTec) was post-treated as Example 1 with the exception that 3% (w/w) p-nitro-benzenesulfonyl chloride was used in the MeOH solution. The membrane was then tested under standard brackish NaCl aqueous solutions and high salinity 3.5% NaCl simulated seawater solution. (Table 2) After testing on 0.20%, 3.5%, and 0.20% NaCl aqueous solutions sequentially the membrane and its untreated control were chlorinated while running in the test cells with 70 ppm NaOCl at pH 8.5, 77° F. for 30 minutes. The NaOCl was removed and the treated membrane and its untreated control were tested on 0.20% and 3.5% NaCl sequentially again (Table 2). Pressures and temperatures are given and the units of permeability and salt transmission are as Table 1.

TABLE 2

| experiment order | NaCl concentration (%) | A value | NaCl Passage (%) | Temperature (deg C.) | Pressure (PSIG) |
|---|---|---|---|---|---|
| Post-treatment according to Example 3 | | | | | |
| 1 | 0.2 | 5 | 0.27 | 25 | 227 |
| 2 | 3.5 | 2.5 | 0.25 | 24 | 804 |
| 3 | 0.2 | 3.6 | 0.2 | 25 | 228 |
| 4 | Chlorination in Cells | | | | |
| 5 | 0.2 | 3.3 | 0.11 | 25 | 226 |
| 6 | 3.5 | 2.3 | 0.22 | 26 | 796 |
| Control to Example 3 | | | | | |
| 1 | 0.2 | 11.1 | 1.41 | 25 | 227 |
| 2 | 3.5 | 4.7 | 1.4 | 24 | 804 |
| 3 | 0.2 | 7.8 | 1.52 | 26 | 225 |
| 4 | Chlorination in Cells | | | | |
| 5 | 0.2 | 7.1 | 0.36 | 25 | 226 |
| 6 | 3.5 | 4.2 | 1.05 | 26 | 796 |

Example 4

Commercial flat-sheet composite polyamide reverse osmosis membrane (FT30 from FilmTec) was post-treated as Example 1 with the exception that the methanol solution also contained 4% (w/w) ethylene glycol dimethyl ether and only contained 0.1% triethyl amine. Various aryl sulfonyl chlorides were used including di and trisulfonyl chlorides. The membranes were tested at standard brackish RO conditions (2000 ppm NaCl in DI water, pH 7, 225 psig, 75° F., 1 gpm cross-flow) and data is shown in Table 3.

TABLE 3

| Testing sequence | Membrane | Aryl sulfonyl chloride | A value | % Pass |
|---|---|---|---|---|
| 1 | Example 4 | m-benzene disulonyl chloride | 7.6 | 0.61 |
| 1 | | p-nitrobenzenesulfonyl chloride | 5.6 | 0.47 |
| | | 1,3,5-benzene trisulfonyl chloride | 9.8 | 0.50 |
| 1 | Control to Example 4 | untreated AG-F | 8.9 | 2.62 |
| 2 | Chlorination as per Example 3 | | | |
| 3 | Example 4 | m-benzene disulonyl chloride | 7.8 | 0.28 |
| 3 | | p-nitrobenzenesulfonyl chloride | 5.5 | 0.21 |
| 3 | | 1,3,5-benzene trisulfonyl chloride | 10.1 | 0.32 |
| 3 | Control to Example 4 | untreated AG-F | 9.1 | 0.45 |

Example 5

A polysulfonamide membrane was made and post-treated as Example 2 except that m-benzenedisulfonyl chloride was used instead of the aryl monosulfonyl chlorides listed in Table 1. The membrane was tested with NaCl and $Na_2SO_4$ in water and data are shown in Table 4. Also this membrane was tested with 2000 ppm NaCl at various pH values along side an untreated polysulfonamide control membrane made as per Example 2. The plot of % rejection for the treated and untreated vs. pH is shown in FIG. 2.

TABLE 4

| | Best Coupon | |
|---|---|---|
| | A Value | % Passage |
| 2000 ppm NaCl | 5.4 | 0.85% |
| 900 ppm NaCl | 6.0 | 0.62% |
| 2000 ppm $Na_2SO_4$ | 5.9 | 0.18% |

Example 6

Figure 3:
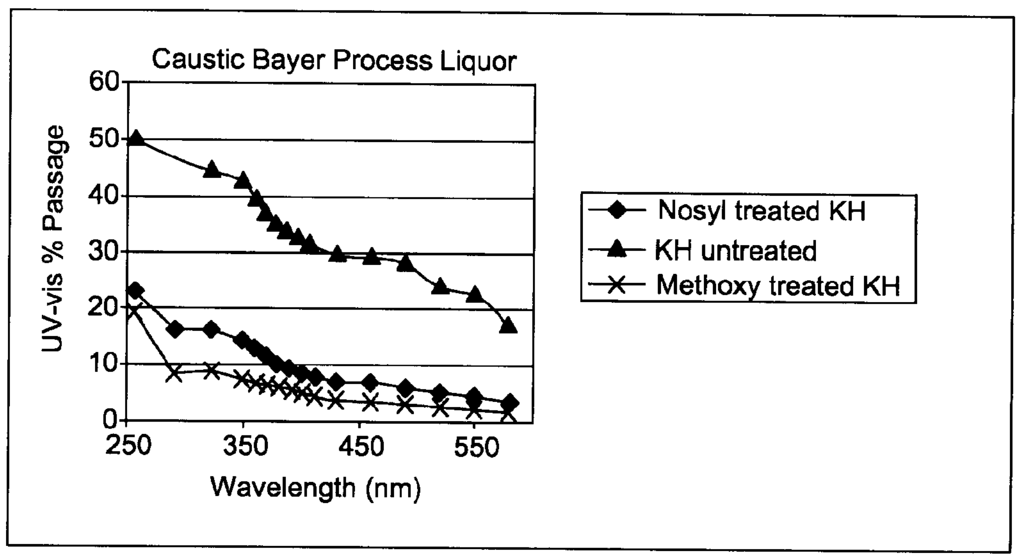
FIG. 3 is a graph showing treated and untreated membranes tested on a high caustic Bayer process liquor in stirred cells with 600 psig pneumatic pressure at room temperature. The membranes were prepared according to Example 6. The graph is % passage measured by UV-vis v. wavelength in nm.

A commercially available polysulfonamide membrane (from GE Water & Process Technologies) was treated as the oven dried membrane in Example 2. The aryl sulfonyl chlorides used were p-nitrobenzenesulfonyl chloride and p-methoxybenzene-sulfonyl chloride. The membrane was tested on a high caustic Bayer process liquor in stirred cells with 600 psig pneumatic pressure at room temperature RT. The resulting permeate was examined with UV-vis absorbance and decreases in the absorbance ABS was interpreted as evidence of removing humic degradation organic compounds. The ratio of Absorbance of permeate divided by feed plotted at various wavelengths is shown in FIG. 3.

Example 7

Figure 4:
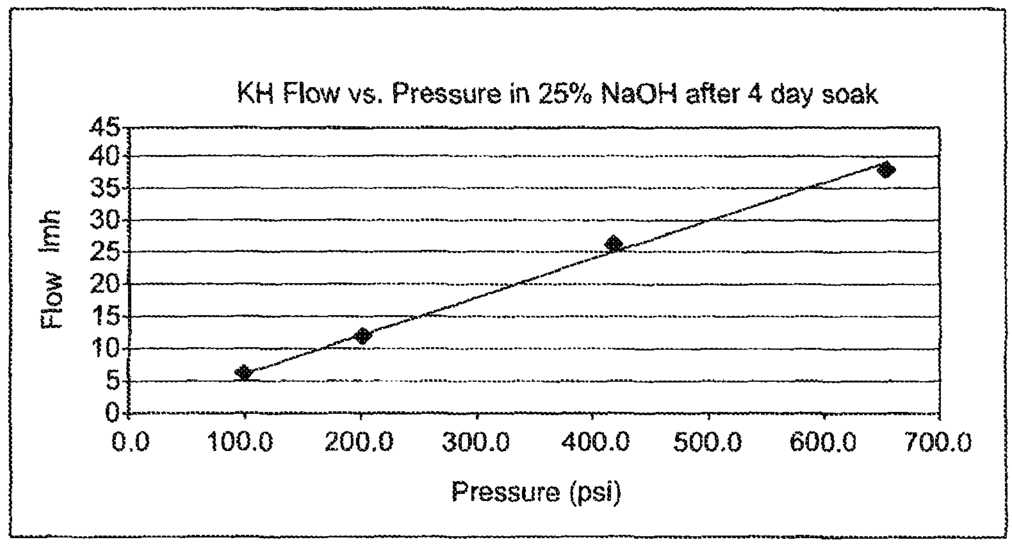
FIG. 4 is a graph showing the yield permeate flow as a function of pressure for a membrane prepared according to Example 7 and soaked in 25% sodium hydroxide by weight in water for 4 days. The graph is permeate flow in lmh v. pressure in psi.

A commercially available polysulfonamide KH membrane (from GE Water & Process Technologies) was soaked in 25% sodium hydroxide by weight in water for 4 days then coupons were cut and placed in steel dead end test cells equipped with magnetic stirring. The cells were charged with 25% sodium hydroxide by weight in water at room temperature. The cells were pressurized with nitrogen to various pressures from 100 psig to 650 psig. The ability of the KH membrane to yield permeate flow as a function of pressure is shown in FIG. 4. The Y-intercept value of 0 psi indicates that no NaOH is rejected. Lmh is a notation of flux, in units of liters/$m^2$*hr).

Example 8

A commercially available polysulfonamide KH membrane (from GE Water & Process Technologies) was placed in stirred cells as in Example 7. The cells were charged with 2% by weight NaOH water solution that also contained 100 ppm of 1,3,6-naphthalene trisulfonate, sodium salt ("NTSA", MW 434). The cells were pressurized for 1 hr at 200 psig with nitrogen and stirring. The rejection of the aromatic compound was measured by recording the UV absorbance of the feed and permeate solutions at 287 nm. The % rejection of NTSA was 73%. The flux was measured at 200 psig to be 57 LMH. (LMH is a notation of flux, in units of liters/($m^2$*hr).)

Example 9

Figure 5:
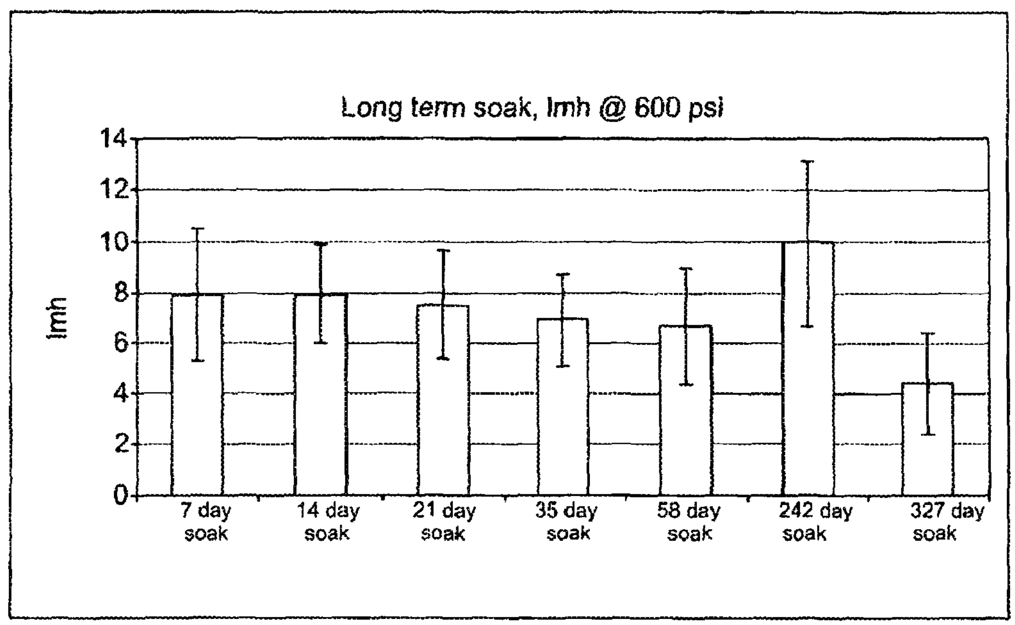
FIG. 5 is a bar graph showing the flux at a pressure of 600 psi for a membrane prepared according to Example 9 and soaked in 25% sodium hydroxide by weight in water. The bar graph is permeate flow in lmh v. day soak time.
Figure 6:
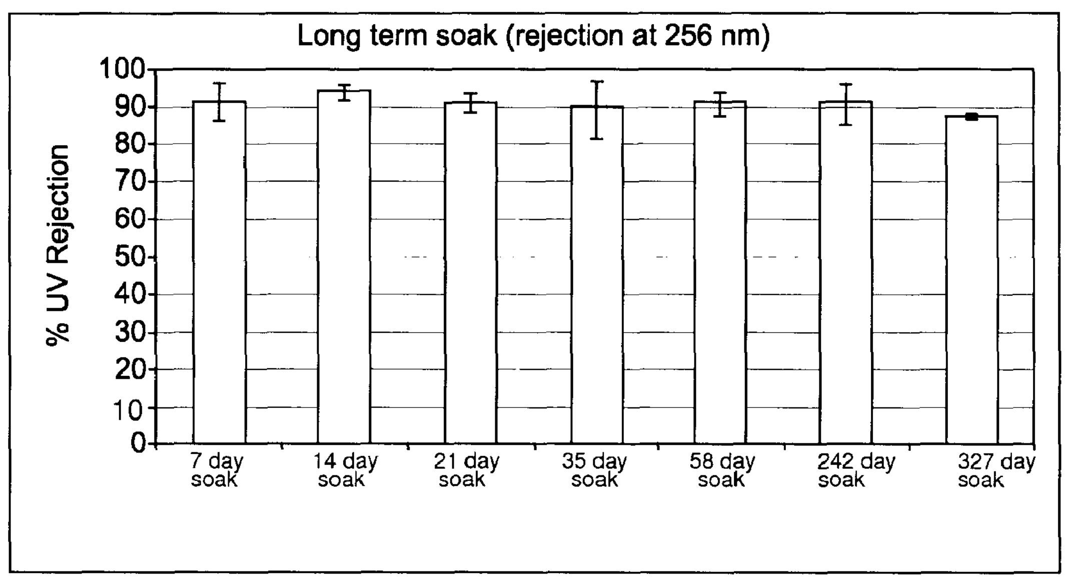
FIG. 6 is a bar graph showing rejection values for a membrane prepared according to Example 9 and soaked in 25% sodium hydroxide by weight in water. The bar graph is % rejection as measured by UV spectrometer v. day soak time.

A sulfonamide membrane was prepared as follows. An interfacially prepared composite sulfonamide membrane was prepared using a support membrane comprising a 4 mil polyphenylenesulfide backing material, with the support membrane having membrane characteristics of an A value of 40-60, and a molecular weight cut-off MWCO of about 3,000 Daltons. This support membrane was then coated with an aqueous solution of triethylenetetramine and dimethylaminopyridine and the excess removed by an airknife. An isoparrafin solution of napthalenetrisulfonyl chloride was then applied and placed in an oven. The rejection characteristics of this membrane when tested on magnesium sulfate in water are similar to the rejection characteristics of commercial membrane KH, which uses a polyester backing material. This membrane was then cut into 28 coupons and soaked in 25% by weight NaOH in water at 65 deg C. A set of four coupons were removed after 7 days, 14 days, 21 days, 35 days, 58 days, 242 days, and 327 days respectively. After each soaking period, the four coupons were placed in the stirred pressure cells described in example 7 and the cells were charged with freshly made solutions of 1000 ppm sodium humate (from Aldrich. Chemical Co) in 25% by weight NaOH water solution. The cells were pressurized to 600 psig at room temperature (20-25 deg C.) and allowed to permeate 1 hr before testing with stirring. The flux and rejection values are shown in FIGS. 5 and 6. Percent rejection was measured with UV spectrometer as described in example 8 with the exception that the UV wavelength was 256 nm. As the plots show, the 7 day soak values produced coupons which had an average flux of 7.9 (+/−2.6) LMH at 600 psig and a % rejection value of 91% (+/−4%). The 327 day soak in the hot caustic produced coupons which had an average flux of 4.4 (+/−2.0) LMH at 600 psig and a % rejection value of 88% (+/−1%). Lmh is a notation of flux, in units of liters/($m^2$*hr).

Example 10

A membrane prepared as in Example 9 was tested in stirred pressure cells (as those used in Example 7). The coupon was placed dry into the cell, and the cell was charged with 300 mL of a process solution obtained from a Bayer alumina refinery. The solution was a spent Bayer liquor sample from the main Bayer circuit and was filtered to remove suspended solids prior to adding to the membrane test cell. The cell was pressurized to 700 psig with nitrogen at 25 deg C. and allowed to permeate 1 hr before data was collected. The flux was measured to be 2.0 LMH at 700 psig. The permeate and feed were examined with UV-vis spectrometer at 400 nm after diluting with known quantities of water so that the absorbance was within range of the detector. The % rejection at 400 nm was determined to by 80%. The permeate and feed samples were also analyzed with a combustion TOC analyzer after dilutions (similar to those used in the UV-vis measurements). The TOC % rejection was determined to be 55%.

Example 11

A membrane prepared as in Example 9 was rolled into a 2 inch (diameter) membrane element using standard industry procedures for making spiral wound membrane elements. This element had standard polypropylene feed spacers and permeate carriers (sheet materials) and the membrane envelope packets were glued together with epoxy glue. The element was encased in fiberglass and stainless steel anti-telescoping devices were glued on each cylinder end with epoxy. The element was placed in a steel housing and was subjected to a 1% NaOH by weight water solution containing 1000 ppm sodium humate (Aldrich Chemical Co) at 150 psig and 3000 mL/min cross-flow rate. After seven days of continuous run time the flux was measured to by 37 LMH at 150 psig and 24 deg C. The permeate and feed samples were examined by UV-vis spectroscopy at 350 nm. The % rejection was determined to be 96%.

Example 12

A membrane element prepared similar to that in Example 11 using membrane prepared as in Example 9 was tested in the same apparatus as Example 11. The element was subjected to Bayer process liquor similar to that used in Example 10. The test was conducted for 1 hr at 500 psig and 25 deg C. The flux was 4.6 LMH at 500 psig. The UV-vis rejection was measured similar to the method described in Example 10 and was found to be 79% at 400 nm. The TOC rejection was measured similar to the method described in Example 10 and found to be 45%.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

We claim:

1. A modified insoluble branched condensation polymer matrix comprising, 1) an insoluble branched condensation polymer matrix comprising reactant residues, and 2) a plurality of aryl residues that differ from said reactant residues and that are terminally-linked to the insoluble branched condensation polymer matrix through sulfonamide bonds.

2. The modified insoluble branched condensation polymer matrix of claim 1 wherein the insoluble branched condensation polymer matrix comprising reactant residues is a polyamide.

3. The modified insoluble branched condensation polymer matrix of claim 1 wherein the insoluble branched condensation polymer matrix comprising reactant residues is a polysulfonamide.

4. The modified insoluble branched condensation polymer matrix of claim 1 which comprises 1) an insoluble branched polyamide matrix, and 2) a plurality of aryl residues that are terminally-linked to the insoluble branched polyamide matrix through sulfonamide bonds.

5. The modified insoluble branched condensation polymer matrix of claim 1 which comprises, 1) an insoluble branched condensation polymer matrix, and 2) a plurality of aryl residues of the formula Ar—$SO_2$—, wherein each Ar is independently an aryl group or a heteroaryl group.

6. The modified insoluble branched condensation polymer matrix of claim 5 wherein the insoluble branched condensation polymer matrix is a polyamide.

7. The modified insoluble branched condensation polymer matrix of claim 5 wherein the insoluble branched condensation polymer matrix is a polysulfonamide.

8. The modified insoluble branched condensation polymer matrix of claim 1 wherein each aryl residue is an aryl group that is substituted with one or more substituents independently selected from cyano, halo, hydroxy, mercapto, nitro, carboxy, sulfo, ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy; wherein each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy is optionally substituted with one or more cyano, halo, hydroxy, mercapto, nitro, carboxy, sulfo, oxo (═O), thioxo (═S) and —$NR_aR_b$ and wherein one or more carbons of each ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy can optionally be replaced with —O—, —S—, or —$NR_c$—, wherein each $R_c$ is independently hydrogen, ($C_1$-$C_6$)alkyl, ($C_1$-$C_6$)alkoxy, ($C_1$-$C_6$)alkoxycarbonyl, or ($C_1$-$C_6$)alkanoyloxy; and wherein $R_a$ and $R_b$ may be the same or different and are chosen from hydrogen, ($C_1$-$C_{20}$)alkyl, ($C_1$-$C_{20}$)alkoxy, ($C_1$-$C_{20}$)alkoxycarbonyl, and ($C_1$-$C_{20}$)alkanoyloxy, or wherein $R_a$ and $R_b$ together with the nitrogen to which they are attached form a pyrrolidino, piperidino, morpholino, or thiomorpholino ring.

9. The modified insoluble branched condensation polymer matrix of claim 1 wherein the aryl residues that are terminally-linked are substituted with one or more substituents independently selected from cyano, halo, hydroxy, mercapto, nitro, trifluoromethyl, trifluoromethoxy, $(C_1\text{-}C_6)$alkyl, $(C_1\text{-}C_6)$alkoxycarbonyl, $(C_1\text{-}C_6)$alkanoyloxy, and —$NR_aR_b$, wherein $R_a$ and $R_b$ may be the same or different and are chosen from hydrogen and $(C_1\text{-}C_6)$alkyl.

10. The modified insoluble branched condensation polymer matrix of claim 1 wherein the aryl residues that are terminally-linked are residues of benzenedisulfonyl chloride, naphthalene trisulfonyl chloride, or benzenetrisulfonyl chloride.

11. The modified insoluble branched condensation polymer matrix of claim 1 wherein the insoluble branched condensation polymer matrix comprising reactant residues is derivable from sulfonyl monomers having at lease two sulfonyl groups and amine monomers or oligomers having at least two amine groups.

12. The modified insoluble branched condensation polymer matrix of claim 1 wherein the insoluble branched condensation polymer matrix comprising reactant residues is obtainable by interfacial polymerization.

13. The modified insoluble branched condensation polymer matrix of claim 1 wherein each aryl residue is a phenylsulfonyl group that is optionally substituted with one or more nitro, methoxy, methyl, bromo, chloro, trifluoromethyl, trifluoromethoxy, or carboxy.

14. The modified insoluble branched condensation polymer matrix of claim 1, wherein the plurality of aryl residues are terminally linked to amine groups on the insoluble branched condensation polymer matrix.

15. The modified insoluble branched condensation polymer matrix of claim 1 wherein each aryl residue is an aryl group that is substituted with substituent —$NR_aR_b$, wherein $R_a$ and $R_b$ may be the same or different and are chosen from hydrogen, $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy, or wherein $R_a$ and $R_b$ together with the nitrogen to which they are attached form a pyrrolidino, piperidino, morpholino, or thiomorpholino ring; wherein each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy is optionally substituted with one or more cyano, halo, hydroxy, mercapto, nitro, carboxy, sulfo, oxo (=O), thioxo (=S) and —$NR_aR_b$ and wherein one or more carbons of each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy can optionally be replaced with —O—, —S—, or —$NR^c$—, wherein each $R_c$ is independently hydrogen, $(C_1\text{-}C_6)$alkyl, $(C_1\text{-}C_6)$alkoxy, $(C_1\text{-}C_6)$alkoxycarbonyl, or $(C_1\text{-}C_6)$alkanoyloxy.

16. The modified insoluble branched condensation polymer matrix of claim 1 wherein each aryl residue is a heteroaryl group that is substituted with substituent —$NR_aR_b$, wherein $R_a$ and $R_b$ may be the same or different and are chosen from hydrogen, $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy, or wherein $R_a$ and $R_b$ together with the nitrogen to which they are attached form a pyrrolidino, piperidino, morpholino, or thiomorpholino ring; and wherein each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy is optionally substituted with one or more substituents independently selected from cyano, halo, hydroxy, mercapto, nitro, carboxy, sulfo, oxo (=O), thioxo (=S) and —$NR_aR_b$; and wherein one or more carbons of each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy can optionally be replaced with —O—, —S—, or —$NR_c$—, wherein each $R_c$ is independently hydrogen, $(C_1\text{-}C_6)$alkyl, $(C_1\text{-}C_6)$alkoxy, $(C_1\text{-}C_6)$alkoxycarbonyl, or $(C_1\text{-}C_6)$alkanoyloxy.

17. The modified insoluble branched condensation polymer matrix of claim 1 wherein each aryl residue is an aryl group that is substituted with one or more substituents independently selected from cyano, halo, hydroxy, mercapto, nitro, carboxy, $(C_1\text{-}C_{20})$alkyl, $(C_1\text{-}C_{20})$alkoxy, $C_1\text{-}C_{20})$alkoxycarbonyl, and $(C_1\text{-}C_{20})$ alkanoyloxy wherein each $(C_1\text{-}C_{20})$alkyl, $(C_1\text{-}C_{20})$alkoxy $(C_1\text{-}C_{20})$alkoxycarbonyl, and $(C_1\text{-}C_{20})$alkanoyloxy is optionally substituted with one or more cyano, halo, hydroxy, mercapto, nitro, carboxy, sulfo, oxo (=O), thioxo (=S) and —$NR_aR_b$; and wherein one or more carbons of each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy can optionally be replaced with —O—, —S—, or —$NR_c$—, wherein each $R_c$ is independently hydrogen, $(C_1\text{-}C_6)$alkyl, $(C_1\text{-}C_6)$alkoxy, $(C_1\text{-}C_6)$alkoxycarbonyl, or $(C_1\text{-}C_6)$alkanoyloxy; and wherein $R_a$ and $R_b$ may be the same or different and are chosen from hydrogen, $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy, or wherein $R_a$ and $R_b$ together with the nitrogen to which they are attached form a pyrrolidino, piperidino, morpholino, or thiomorpholino ring.

18. The modified insoluble branched condensation polymer matrix of claim 1 wherein each aryl residue is a heteroaryl group that is optionally substituted with one or more substituents independently selected from cyano, halo, hydroxy, mercapto, nitro, carboxy, sulfo, $(C_1\text{-}C_{20})$alkyl, $C_1\text{-}C_{20})$alkoxy, $(C_1\text{-}C_{20})$alkoxycarbonyl, and $(C_1\text{-}C_{20})$alkanoyloxy, and wherein each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy is optionally substituted with one or more substituents independently selected from cyano, halo, hydroxy, mercapto, nitro, carboxy, sulfo, oxo (=O), thioxo (=S) and $NR_aR_b$; and wherein one or more carbons of each $(C_1\text{-}C_{20})$alkyl, $(C_1\text{-}C_{20})$alkoxy, $(C_1\text{-}C_{20})$alkoxycarbonyl, and $(C_1\text{-}C_2)$alkanoyloxy can optionally be replaced with —O—, —S—, or —$NR_c$—, wherein each $R_c$ is independently hydrogen, $(C_1\text{-}C_6)$alkyl, $(C\text{-}C_6)$alkoxy, $(C_1\text{-}C_6)$alkoxycarbonyl, or $(C_1\text{-}C_6)$alkanoyloxy; and wherein $R_a$ and $R_b$ may be the same or different and are chosen from hydrogen, $(C_1\text{-}C_{20})$alkyl, $(C_1\text{-}C_{20})$alkoxy $(C_1\text{-}C_{20})$alkoxycarbonyl, and $(C_1\text{-}C_{20})$alkanoyloxy, or wherein $R_a$ and $R_b$ together with the nitrogen to which they are attached form a pyrrolidono, piperidino, morpholino, or thiomorpholino ring.

19. A method for preparing a modified insoluble branched condensation polymer matrix comprising, treating an insoluble branched condensation polymer matrix comprising reactant residues and having a plurality of primary or secondary amine groups, with a compound of the formula Ar—$SO_2$—X, wherein each X is a leaving group, each Ar is an aryl group or a heteroaryl group, and the reactant residues are not Ar—$SO_2$—, to provide the modified insoluble branched condensation polymer matrix, wherein treating the insoluble branched condensation polymer matrix comprises reacting the compound of formula Ar—$SO_2$—X to a terminal link of the insoluble branched condensation polymer matrix.

20. A method for preparing a modified insoluble branched condensation polymer matrix comprising treating an insoluble branched polyamide matrix having a plurality of primary or secondary amine groups with a compound of the formula Ar—$SO_2$—X, wherein each X is a leaving group, and each Ar is an aryl group or a heteroaryl group, to provide the modified insoluble branched condensation polymer matrix, wherein treating the insoluble branched polyamide matrix comprises reacting the compound of formula Ar—$SO_2$—X to a terminal link of the insoluble branched polyamide matrix.

21. A method for preparing a modified insoluble branched condensation polymer matrix comprising treating an insoluble branched condensation polymer matrix having a plurality of primary or secondary amine groups, with a compound of the formula Ar—$SO_2$—X, wherein each X is a leaving group, and each Ar is 1) a 6-20 carbon monocyclic, bicyclic, or polycyclic ring system in which at least one ring is aromatic; or 2) a 1-20 carbon monocyclic, bicyclic, or polycyclic ring system in which at least one heteroatom containing ring is aromatic; to provide the modified insoluble branched condensation polymer matrix, wherein treating the insoluble branched condensation polymer matrix comprises reacting the compound of formula Ar—$SO_2$—X to a terminal link of the insoluble branched condensation polymer matrix.

22. The method for preparing a modified insoluble branched condensation polymer matrix according to claim 21, wherein 1) the 6-20 carbon ring system is substituted with one or more substituents independently selected from cyano, halo, hydroxy, mercapto, nitro, carboxy, $(C_1$-$C_{20})$alkyl, $(C_1$-$C_{20})$alkoxy, $(C_1$-$C_{20})$alkoxycarbonyl, $(C_1$-$C_{20})$alkanoyloxy, and phenyl; wherein each $(C_1$-$C_{20})$alkyl, $(C_1$-$C_{20})$alkoxy, $(C_1$-$C_{20})$alkoxycarbonyl, and $(C_1$-$C_{20})$alkanoyloxy is optionally substituted with one or more substituents independently selected from cyano, halo, hydroxy, mercapto, nitro, carboxy, sulfo, oxo (═O), thioxo (═S) and —$NR_aR_b$; and wherein one or more carbons of each $(C_1$-$C_{20})$alkyl, $(C_1$-$C_{20})$alkoxy, $(C_1$-$C_{20})$alkoxycarbonyl, and $(C_1$-$C_{20})$alkanoyloxy can optionally be replaced with —O—, —S—, or —$NR_c$—, wherein each $R_c$ is independently hydrogen, $(C_1$-$C_6)$alkyl, $(C_1$-$C_6)$alkoxy, $(C_1$-$C_6)$alkoxycarbonyl, or $(C_1$-$C_6)$alkanoyloxy; and wherein $R_a$ and $R_b$ may be the same or different and are chosen from hydrogen $(C_1$-$C_{20})$alkyl, $(C_1$-$C_{20})$alkoxy, $(C_1$-$C_{20})$alkoxycarbonyl, and $(C_1$-$C_{20})$alkanoyloxy, or wherein $R_a$ and $R_b$ together with the nitrogen to which they are attached form a pyrrolidino, piperidino, morpholino, or thiomorpholino ring; or 2) the 1-20 carbon ring system is substituted with one or more substituents independently selected from cyano, halo, hydroxy, mercapto, nitro, carboxy, $(C_1$-$C_{20})$alkyl, $(C_1$-$C_{20})$alkoxy, $(C_1$-$C_{20})$alkoxycarbonyl, and $(C_1$-$C_{20})$alkanoyloxy; wherein each $(C_1$-$C_{20})$alkyl, $(C_1$-$C_{20})$alkoxy, $(C_1$-$C_{20})$alkoxycarbonyl, and $(C_1$-$C_{20})$alkanoyloxy is optionally substituted with one or more substituents independently selected from cyano, halo, hydroxy, mercapto, nitro, carboxy, sulfo, oxo (═O), thioxo (═S) and —$NR_aR_b$; and wherein one or more carbons of each $(C_1$-$C_{20})$alkyl, $(C_1$-$C_{20})$alkoxy, $(C_1$-$C_{20})$alkoxycarbonyl, and $(C_1$-$C_{20})$alkanoyloxy can optionally be replaced with —O—, —S—, or —$NR_c$—, wherein each $R_1$ is independently hydrogen, $(C_1$-$C_6)$alkyl, $(C_1$-$C_6)$alkoxy, $(C_1$-$C_6)$alkoxycarbonyl, or $(C_1$-$C_6)$alkanoyloxy; and wherein $R_a$ and $R_b$ may be the same or different and are chosen from hydrogen, $(C_1$-$C_{20})$alkyl, $(C_1$-$C_{20})$alkoxy, $(C_1$-$C_{20})$alkoxycarbonyl, and $(C_1$-$C_{20})$alkanoyloxy, or wherein $R_a$ and $R_b$ together with the nitrogen to which they are attached form a pyrrolidino, piperidino, morpholino, or thiomorpholino ring.

23. The method for preparing a modified insoluble branched condensation polymer matrix according to claim 21, wherein 1) the 6-20 carbon ring system is substituted with substituent —$NR_aR_b$, wherein $R_a$ and $R_b$ may be the same or different and are chosen from hydrogen, $(C_1$-$C_{20})$alkyl, $(C_1$-$C_{20})$alkoxy, $(C_1$-$C_{20})$alkoxycarbonyl, and $(C_1$-$C_{20})$alkanoyloxy, or wherein $R_a$ and $R_b$ together with the nitrogen to which they are attached form a pyrrolidino, piperidino, morpholino, or thiomorpholino ring; wherein each $(C_1$-$C_{20})$alkyl, $(C_1$-$C_{20})$alkoxy, $(C_1$-$C_{20})$alkoxycarbonyl, and $(C_1$-$C_{20})$alkanoyloxy is optionally substituted with one or more substituents independently selected from cyano, halo, hydroxy, mercapto, nitro, carboxy, sulfo, oxo (═O), thioxo (═S) and —$NR_aR_b$; and wherein one or more carbons of each $(C_1$-$C_{20})$alkyl, $(C_1$-$C_{20})$alkoxy, $(C_1$-$C_{20})$alkoxycarbonyl, and $(C_1$-$C_{20})$alkanoyloxy can optionally be replaced with —O—, —S—, or —$NR_c$—, wherein each $R_c$ is independently hydrogen, $(C_1$-$C_6)$alkyl, $(C_1$-$C_6)$alkoxy, $(C_1$-$C_6)$alkoxycarbonyl, or $(C_1$-$C_6)$alkanoyloxy; or 2) the 1-20 carbon ring system is substituted with substituent —$NR_aR_b$, wherein $R_a$ and $R_b$ may be the same or different and are chosen from hydrogen, $(C_1$-$C_{20})$alkyl, $(C_1$-$C_{20})$alkoxy, $(C_1$-$C_{20})$alkoxycarbonyl, and $(C_1$-$C_{20})$alkanoyloxy, or wherein $R_a$ and $R_b$ together with the nitrogen to which they are attached form a pyrrolidino, piperidino, morpholino, or thiomorpholino ring; wherein each $(C_1$-$C_{20})$alkyl, $(C_1$-$C_{20})$alkoxy, $(C_1$-$C_{20})$alkoxycarbonyl, and $(C_1$-$C_{20})$alkanoyloxy is optionally substituted with one or more substituents independently selected from cyano, halo, hydroxy, mercapto, nitro, carboxy, sulfo, oxo (═O), thioxo (═S) and —$NR_aR_b$; and wherein one or more carbons of each $(C_1$-$C_{20})$alkyl, $(C_1$-$C_{20})$alkoxy, $(C_1$-$C_{20})$alkoxycarbonyl, and $(C_1$-$C_{20})$alkanoyloxy can optionally be replaced with —O—, —S—, or —$NR_c$—, wherein each $R_c$ is independently hydrogen, $(C_1$-$C_6)$alkyl, $(C_1$-$C_6)$alkoxy, $(C_1$-$C_6)$alkoxycarbonyl, or $(C_1$-$C_6)$alkanoyloxy.

* * * * *

UNITED STATES PATENT AND TRADEMARK OFFICE

CERTIFICATE OF CORRECTION

PATENT NO. : 8,092,918 B2
APPLICATION NO. : 12/032388
DATED : January 10, 2012
INVENTOR(S) : Kurth et al.

It is certified that error appears in the above-identified patent and that said Letters Patent is hereby corrected as shown below:

In the Specifications

In Column 1, Line 14, after the word "reference.", insert
--This application is also a Continuation-in-Part of co-pending International application No. PCT/US2006/031680, filed August 14, 2006.--

Signed and Sealed this
Fourth Day of June, 2013

Teresa Stanek Rea
*Acting Director of the United States Patent and Trademark Office*